United States Patent [19]

Lush

[11] Patent Number: 4,746,531
[45] Date of Patent: May 24, 1988

[54] SWINE FEED

[75] Inventor: Raymon W. Lush, Bloomfield, Nebr.

[73] Assignee: Bloomfield Feed Mill, Inc., Bloomfield, Nebr.

[21] Appl. No.: 853,570

[22] Filed: Apr. 18, 1986

[51] Int. Cl.$^4$ .............................................. A23K 1/00
[52] U.S. Cl. .................. 426/623; 426/630; 426/520; 426/807
[58] Field of Search ............... 426/623, 630, 636, 807, 426/520

[56] References Cited

U.S. PATENT DOCUMENTS

| | | | |
|---|---|---|---|
| 3,246,594 | 4/1966 | Fisher | 99/238 |
| 3,411,430 | 11/1968 | Rockwell | 99/238 |
| 3,730,729 | 5/1973 | Strommer | 99/26 |
| 3,817,786 | 6/1974 | Algeo | 127/1 |
| 3,845,701 | 11/1974 | Sachnik | 99/323.5 |
| 4,209,537 | 6/1980 | Wood | 426/233 |

OTHER PUBLICATIONS

Morrison "Feeds and Feeding" Morrison Publishing Co., Ithaca, New York (1957), pp. 410–411, 912–915 & 1124–1125.

Primary Examiner—R. B. Penland
Attorney, Agent, or Firm—Zarley, McKee, Thomte, Voorhees & Sease

[57] ABSTRACT

A transition feed for swine for weaning piglets from a sow to a dry feed including as ingredients at least one or more animal protein products, marine products, milk products, grain products, plant protein products, processed grain by-products and natural and artificial flavors in proportions to balance the feed ration for protein, fiber, energy and palatability. Sweet corn also is added as an ingredient of the transition feed to enhance its palatability.

6 Claims, No Drawings

SWINE FEED

This invention relates generally to livestock feed, and in particular, it relates to an improved transition feed for swine. Pre-weaner and starter feeds are considered in the industry as a transition feed. Transition feeds are used to wean the piglet from its natural feed source, i.e., the milk from its mother, to a dry feed.

Transition feeds normally are of two types, either milk-based or corn-based, and both normally include a number of standard ingredients which are included to balance the ration for protein, fiber, energy, and palatability. Such ingredients include, for example, animal protein products, marine products, milk products, grain products, plant protein products, processed grain by-products, natural and artificial flavors. Also included are micro and macro minerals, amino acids, vitamins to include the vitamin B complex, animal fats, vegetable fats and preservatives. In addition, field corn which is normally grown for feeding stock, such as yellow dent corn, flint corn and soft corn and, in some cases, grain sorghum (all hereinafter collectively referred to as field corn) has long been the standard feedstuff or ingredient added to both the milk-based and corn-based transition feeds to provide carbohydrates for the starting through finishing rations of swine. Milk-based transition feeds, in addition, have an abundance of milk products and milk product type ingredients (hereinafter referred to as milk products) added as a standard base ingredient for the purpose of high nutrient value and palatability.

Milk-based transition feeds normally included an abundance of milk products to induce the piglets to accept the feed and reduce the stress on the piglet when they are weaned from the sow and introduced to the corn-based transition feed. The addition of milk products adds substantially to the cost of the transition feeds. Once the piglets have been fed the milk-based transition feeds for a period of time and are consuming appropriate amounts, they are then introduced to the corn-based transition feed. Accordingly, the piglets are subjected to two periods of stress: the first being when they are taken from the sow and no longer are receiving her milk in addition to the milk-based transition feed; and secondly, when they are taken from the milk-based transition feed and introduced to the corn-based transition feed.

In feeding the piglets the transition feeds, it is also desired to produce the greatest weight gains of the shortest period of time. Time is an important factor because the age and weight of pigs are determining factors in a producer's ability to remove piglets from the sow, thereby reducing the length of the sow's lactation period. The importance of the sow's lactation period is that it can and does vary from approximately 2 weeks to approximately 8 weeks, with a variation of up to 50 days. Accordingly, the sooner the piglet is weaned, the sooner the sow is ready for rebreeding, which means more pigs per year for the producer. Optimum production levels can vary from as high as 2.8 litters per sow per year (e.g., 2.8 litters × average of 8 pigs per litter = 22.4 pigs) achieved on a 10 day lactation period to a 2 litter per sow per year (e.g., 2 litters × average of 8 pigs per litter = 16 pigs) on a 56 day lactation period.

Transition feeds which include the previous mentioned ingredients generally are typical of those used and usually produce acceptable weight gains in the presence of stress associated with the transition period, but not always as efficient as possible to be beneficial to the producer. Accordingly, efforts are constantly being made to formulate a transition feed which the piglets will accept sooner and consume more of, thereby reducing stress through the transition period and thus producing a larger and more efficient pig. The producer, the nutritionist, and the feed manufacturer, therefore, are constantly striving to formulate such a transition feed.

Accordingly, it is an object of the present invention to provide an improved livestock feed and, in particular, an improved transition feed for swine.

A further object is to provide such a feed which is more palatable and thus accepted sooner so that earlier weight gains are realized.

A further object is to provide such a feed which is more palatable, thus accepted sooner and consumed in larger amounts, thereby reducing stress on the piglet.

Still another object is to provide such a feed that will produce the greatest weight gains in the shortest period of time.

A still further object is to provide such a transition feed which includes fewer milk products and thus reduces the cost of formulating the feed and which can be fed to the piglets without first having to introduce the piglet to a milk-based feed having a higher percentage of milk products.

Still another object is to alleviate stress during the second transition period pertaining to the piglet transitioning from the milk-based feed to the corn-based feed, stress being detrimental to weight gains and efficiency.

The above objectives are accomplished either by substituting sweet corn, International Feed No. 40297 (Botanical name—Zea Mays Saccharata) which normally is grown for human consumption as opposed to feeding stock for the field corn in the milk-base transition feed, or by adjusting the percentages of sweet corn and field corn as the piglets go through the transition period in a fashion such as to increase the palatability of the feed so that they consume larger amounts of the feed and at the same time reduce the stress on the piglets in introducing them to a corn-based feed.

Sweet corn is grown presently and in the past for three purposes: (1) to be harvested in the ear in the milk stage, to be consumed by the general public to be eaten off the ear; (2) to be harvested in the ear in the milk stage, to be either canned or frozen in the kernel form by the public or commercial concerns; (3) a very minute percentage of the production is grown for the reproduction of seed in which case the sweet corn is left to mature further in the field. The variety of the sweet corn will dictate the stage of maturity for optimum harvest of high germination seed for resale as hybrid or open pollinated sweet corn seed.

Sweet corn is planted in the same manner and with the same equipment that is used to produce field corn. Harvesting of sweet corn for any purpose other than resale seed production is done in the ear while the kernel is in the milk stage.

As indicated above, in accordance with the invention, sweet corn, International Feed No. 40297 (Botanical name—Zea Mays Saccharata) is either substituted for or added in certain percentages with the field corn normally used in the past as an ingredient of the transition feed. The sweet corn is planted and cultivated in the same manner as field corn and is left in the field to mature past the milk stage, which is the normal harvest period for sweet corn. It is left in the field to mature as long as possible to allow maximum dry down of the kernel before ear droppage and stalk lodging occurs to the point it is no longer economically feasible to harvest. Preferably, it is harvested at the 14% to 15% moisture stage, at which point it can be stored and will remain in excellent condition to be used at a later date.

The sweet corn subsequently is prepared for use as an ingredient of the transition feed in a number of different methods. One method is directed to reducing the kernels to a smaller particle size, and this can be accomplished by, for example, crushing, grinding, rolling, or otherwise reducing the kernel to a smaller particle size (hereinafter collectively referred to as grinding sweet corn with the end result hereinafter referred to as ground sweet corn). In some methods of processing, the sweet corn does not have to be ground in order to reduce the kernel to smaller particles since this effectively occurs as a result of the process itself. Examples of these methods or processes include the extrusion process and texturizing a feed. The sweet corn, either before or after it is ground, also may be heat processed by, for example, roasting, extruding, expelling, exploding, flaking, cooking, micronizing, steam processed flaking, pressure processed flaking, or popping it (hereinafter collectively referred to as roasting with the end result referred to as roasted sweet corn). The sweet corn is roasted so as to, for example, change the starches to sugars. Other chemical changes likewise may take place.

The ground, roasted, or ground unroasted sweet corn is then substituted for or added with the field corn which, as indicated above, has been the standard ingredient added to the transition feed to provide carbohydrates. It likewise can be substituted for some of the grain products, milk products, processed grain by-products, plant protein products, animal protein products or marine products conventionally used in the transition feeds as more specifically set forth below.

The amount of sweet corn to be used may totally replace the field corn, or may vary from a small percentage to a large percentage in the transition feed ration. In this respect, one determining factor is if one is formulating a concentrate which is used as an ingredient in a complete ration, or if one is formulating a whole complete ration. Another determining factor is whether one is formulating a transition feed for the first stress period or the second stress period. Other factors in determining the percent of ground or unground, roasted or unroasted sweet corn is the age of the piglet, the piglet environment, or the length of time on first transition feed. These are all factors that affect the consumption rate needed to obtain maximum efficiency. Palatability of the transition feed is the key factor in determining the amount of sweet corn used in formulating the ration. In formulating a ration, the manufacturer or nutritionist always strives to balance the ration for protein, fiber, energy, and palatability. When the substitution of sweet corn is made, the ration is balanced in the same fashion, taking into consideration the above-defined determining factors. Accordingly, while no two transition feed formulas may be exactly alike, set forth below are representative examples of typical transition feed formulas using sweet corn which are formulated to provide balanced rations.

|  | Trans. Period #1 | | Trans. Period #2 | |
|---|---|---|---|---|
| INGREDIENT | Approx. 7# pig #1 | Approx. 15# pig #2 | Approx. 15# pig #3 | Approx. 30# pig #4 |
| Field Corn |  | 243.44 | 536.34 | 820.02 |
| Sweet Corn | 793.48 | 699.98 | 599.98 | 400.0 |
| Rolled Oats |  |  |  |  |
| 4-80 Dry Fat | 100.0 | 75.0 | 50.0 |  |
| Whole Processed Soy Beans | 277.32 | 272.34 | 263.8 | 400.02 |
| 44% Soy Meal | 483.72 | 409.66 | 343.76 | 220.38 |
| Soy Protein Concentrate |  |  |  |  |
| Fish Meal |  |  |  |  |
| Vitamin Trace Mineral Premix | 5.0 | 5.0 | 5.0 | 5.0 |
| Yeast |  |  |  |  |
| Edible Whey | 300.0 | 250.0 | 150.0 | 100.0 |
| Dried Skim Milk |  |  |  |  |
| Limestone | 12.1 | 11.98 | 12.22 | 12.32 |
| Fine Mixing Salt | 1.5 | 2.26 | 3.76 | 4.5 |
| Dical 18.5% | 26.88 | 30.34 | 35.14 | 37.76 |
| Lycine |  |  |  |  |
| Corn Sugar Dext. |  |  |  |  |
| Selenium 200 |  |  |  |  |
| Copper Sulfate |  |  |  |  |
| Artificial Flavor |  |  |  |  |
|  | 2000 | 2000 | 2000 | 2000 |
| Protein | 22.0% | 20.5% | 19.0% | 18.5% |
| Fat | 10.0% | 9.0% | 8.0% | 7.25% |
| Calcium | .8% | .8% | .8% | .8% |
| Phosphorus | .75% | .75% | .75% | .75% |

From the above formulations, it can be seen that during the transition period #1, which corresponds to the transition period during which the piglets normally would be fed milk-base transition feeds, in Formula #1 the sweet corn is substituted for the field corn. Formula #1 would be used first in weaning the piglets from the sow, its natural food source, to the transition feeds. When the piglets reach approximately 15 lbs. in weight, they could be switched to Formula #2 which includes in the feed approximately 35% sweet corn and 12% field corn. On Formula #2 the piglets are slowly introduced to a corn-based feed to reduce the stress on the piglets. During the transition period #2 which corresponds to the transition period during which the piglets normally would be fed corn-based transition feeds, from Formula #3 it can be seen that the percentage of sweet corn and field corn are adjusted to approximately 30% and 27%, respectively, and in Formula #4 they are adjusted to approximately 20% and 41%, respectively. Accordingly, in each case, the piglets are periodically and slowly weaned to a corn-based feed, while still receiving a ration which is balanced for protein, fiber, energy and palatability. In each instance, the sweet corn is included in an amount to enhance the palatability of the transition feed so that the piglets accept the feed sooner and consume it in larger amounts so that earlier and greater weight gains are realized.

The versatility of sweet corn allows the producer to follow the above procedure or modify it according to his managerial abilities or environmental conditions available to him. As an example of this, the transition feed No. 1, which is the higher percentage based sweet corn feed, can be introduced to the piglet while still nursing from the sow. At the normal weaning time the piglet can be removed from the sow and left on the transition feed No. 1 until it has attained the appropriate age and weight at which the producer normally introduces the piglet to a corn-based ration. This then would be only a one-step transition feed concept.

In one test, 54 head of 5-week old pigs were gate-cut into two 27-pig groups. One was fed an 18% regular creep feed, and the other was fed an 18% protein sweet corn creep feed, i.e., sweet corn was substituted for the field corn conventionally used as the principal ingredient. The formulas for the feeds used and the results of the test are as set forth below.

| INGREDIENT | 18% SWEET CORN | 18% REGULAR |
| --- | --- | --- |
| Sweet Corn | 900 lbs. | — |
| Corn | 125 lbs. | 935 lbs. |
| Rolled Oats | 200 lbs. | 200 lbs. |
| F.F. Bean 34.5-22 | 200 lbs. | 345 lbs. |
| Soybean Meal 44 | 275 lbs. | 220 lbs. |
| Fish Meal | 25 lbs. | 25 lbs. |
| BLFD P/S VTM | 8 lbs. | 8 lbs. |
| Yeast | 50 lbs. | 50 lbs. |
| Pellet Binder | 25 lbs. | 25 lbs. |
| Whey | 50 lbs. | 50 lbs. |
| Milk Plus 20 = 10 | 75 lbs. | 75 lbs. |
| Limestone | 15 lbs. | 13 lbs. |
| Fine Mixing Salt | 3 lbs. | 3 lbs. |
| Dical 18.5% | 31 lbs. | 35 lbs. |
| Lysine | 2 lbs. | 2 lbs. |
| Selelium 200 | 2 lbs. | 2 lbs. |
| Tylan Sulfa | 10 lbs. | 10 lbs. |
| Copper Sulfate | 1.5 lbs. | 1.5 lbs. |
| Pig Krave | 2 lbs. | 2 lbs. |
| Hi Sugar Aid | — | 2 lbs. |

The results of the test are as follows:

| | 18% SWEET CORN | 18% REGULAR |
| --- | --- | --- |
| No. of pigs in group | 27 | 27 |
| Total starting weight of pigs | 539 lbs. | 568 lbs. |
| Total finished weight of pigs | 1449 lbs. | 1412 lbs. |
| Total pounds gained | 910 lbs. | 844 lbs. |
| Total pounds of feed used | 1291 lbs. | 1412 lbs. |
| Average starting weight of pig | 19.96 lbs. | 21.03 lbs. |
| Average finished weight of pig | 53.66 lbs. | 52.28 lbs. |
| Lbs. of gain per pig | 33.70 lbs. | 31.25 lbs. |
| Average daily gain | 1.586 lbs. | 1.5625 lbs. |
| Lbs. of feed per lbs. of gain | 1.418 lbs. | 1.703 lbs. |
| Cost per cwt. of feed | $14.80 | $13.63 |
| Cost per lb. of gain | $20.86 | $23.17 |

| | 18% SWEET CORN | 18% REGULAR |
| --- | --- | --- |
| % improvement of daily gain | 7.7% | — |
| % improvement of feed per lb. of gain | 18% | — |
| % improvement of cost per lbs. of gain | 11.1% | — |
| Number of days on test | 20 | 20 |

From the above data, using a value of $1.00 per lb. for extra gain, it can be seen that the value of the pigs on the 18% sweet corn increased by $2.45 per pig over those pigs on the regular 18% feed. It can also be seen that the pigs fed the 18% sweet corn had a 7.7% improvement in daily gain, and that the cost per pound of gain was substantially less.

What is claimed is:

1. In a transition feed for swine for weaning piglets from a sow to a dry feed, said transition feed including as ingredients at least one or more animal protein products, marine products, milk products, grain products, plant protein products, processed gain by-products and natural and artificial flavors in proportions to balance the feed ration for protein, fiber, energy and palatability, the improvement comprising the inclusion of mature sweet corn as an ingredient of said transition feed in a proportion with respect to the other of said ingredients thereof such that the palatability of said transition feed is enhanced and said transition feed is balanced for protein, fiber, energy and palatability.

2. The transition feed of claim 1, wherein said grain products included as an ingredient of said transition feed include field corn, said sweet corn being substituted for and replacing substantially all of said field corn.

3. The transition feed of claim 1, wherein said grain products included as an ingredient of said transition feed include field corn, said sweet corn being included as an ingredient of said transition feed in combination with said field corn, the proportion of sweet corn to field corn being greater for a transition feed for use in initially weaning piglets from a sow and less for a transition feed for use in finally weaning piglets to a corn based feed.

4. The transition feed of claim 1, 2 or 3 wherein said sweet corn comprises ground sweet corn.

5. The transition feed of claim 1, 2 or 3, wherein said sweet corn comprises roasted sweet corn.

6. The transition feed of claim 1, 2 or 3 wherein said sweet corn comprises ground roasted sweet corn.

* * * * *